United States Patent [19]
Setina

[11] Patent Number: 6,113,164
[45] Date of Patent: Sep. 5, 2000

[54] AUXILIARY PUSH BUMPER FOR MOTOR VEHICLE

[75] Inventor: Terry L Setina, Olympia, Wash.

[73] Assignee: Setina Manufacturing Company, Olympia, Wash.

[21] Appl. No.: 09/316,079

[22] Filed: May 20, 1999

[51] Int. Cl.$^7$ .................................................. B60R 19/44
[52] U.S. Cl. ........................ 293/142; 293/115; 293/154
[58] Field of Search .................... 293/142, 143, 293/145, 115, 154, 121, 102; 362/505

[56] References Cited

U.S. PATENT DOCUMENTS

| | | | |
|---|---|---|---|
| D. 236,260 | 8/1975 | Allmand | D12/169 |
| D. 300,128 | 3/1989 | Brennan | D12/169 |
| D. 395,416 | 6/1998 | Shklayaver | D12/169 |
| 2,157,825 | 5/1939 | Jandus | 293/143 |
| 2,194,459 | 3/1940 | Frank. | |
| 2,231,313 | 2/1941 | Ache | 293/143 X |
| 2,280,558 | 4/1942 | Thompson | 362/505 |
| 2,442,580 | 6/1948 | Barlow | 362/505 |
| 2,639,183 | 5/1953 | Williams | 293/142 |
| 2,672,363 | 3/1954 | Buchanan | 293/143 |
| 2,954,256 | 9/1960 | Barenyi | 293/143 |
| 3,438,667 | 4/1969 | Davis | 293/115 |
| 3,574,406 | 4/1971 | Wessells, III. | |
| 3,680,903 | 8/1972 | Hulten. | |
| 3,702,202 | 11/1972 | Rumsey. | |
| 3,746,383 | 7/1973 | Davis. | |
| 4,043,579 | 8/1977 | Meyer | 293/143 |
| 4,498,696 | 2/1985 | Kalchschmied et al. | 293/126 |
| 4,667,995 | 5/1987 | Wilkins | 362/505 |
| 4,811,979 | 3/1989 | Peter et al. | 293/102 |
| 4,838,593 | 6/1989 | Fleming et al. | 293/126 |
| 4,961,603 | 10/1990 | Carpenter | 293/102 |
| 5,215,343 | 6/1993 | Forutne | 293/121 |
| 5,326,142 | 7/1994 | Dodd et al. | 293/115 |
| 5,366,264 | 11/1994 | Guay | 293/125 |
| 5,688,006 | 11/1997 | Bladow et al. | 293/120 |

FOREIGN PATENT DOCUMENTS

| | | | |
|---|---|---|---|
| 405319187 | 12/1993 | Japan | 293/115 |
| 406144133 | 5/1994 | Japan | 293/108 |

OTHER PUBLICATIONS

Rhino Guards! literature, GO RHINO Law Enforcement Division, 3 pages, Jul. 1998.

*Primary Examiner*—D. Glenn Dayoan
*Assistant Examiner*—Patricia Engle
*Attorney, Agent, or Firm*—Klarquist Sparkman Campbell Leigh & Whinston, LLP

[57] ABSTRACT

An auxiliary push bumper for a motor vehicle which is clamped to the original bumper by brackets attached to bumper guards on such push bumper. The push bumper is made of a plurality of bumper sections made of extruded aluminum whose ends are releaseably attached to the bumper guards for easy repair of the push bumper by replacement of a damaged bumper section. In one embodiment the push bumper includes a center section formed of an extruded aluminum u-shaped channel with an diagonal stiffening plate inserted into such channel. The center section is fastened at its opposite ends to a pair of bumper guards which may each be formed of a metal loop and a metal reinforcing plate attached to such loop and to the ends of the center section. A pair of curved side sections of the bumper are fastened at their inner end to the bumper guard plates and fastened at their outer end to the frame of the vehicle. A pair of side lights may be mounted on the bumper guards to transmit light beams from the sides of the vehicle. A second pair of front lights may be mounted on the center section of the bumper to project light beams from the front of the vehicle.

18 Claims, 5 Drawing Sheets

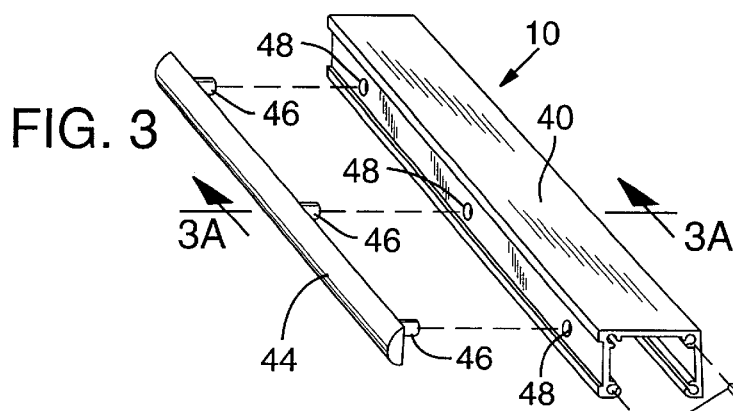
FIG. 3
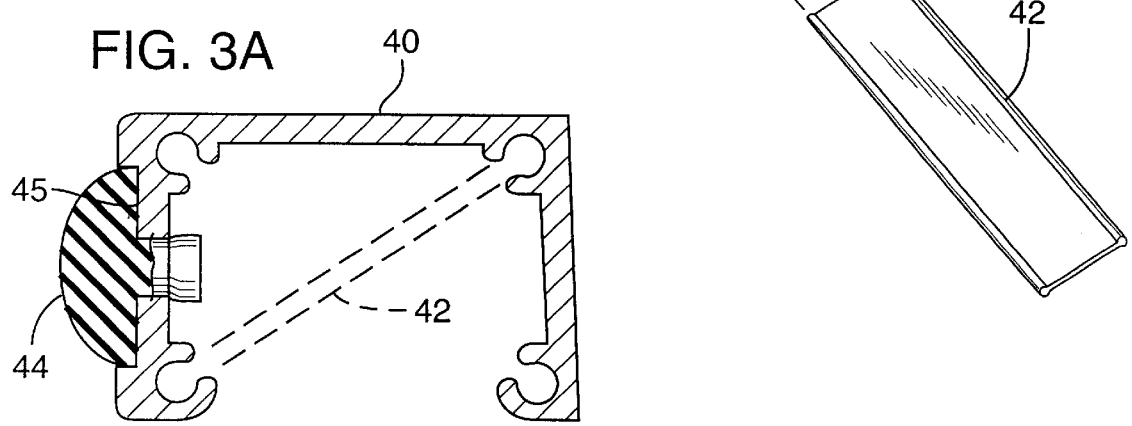
FIG. 3A
FIG. 4
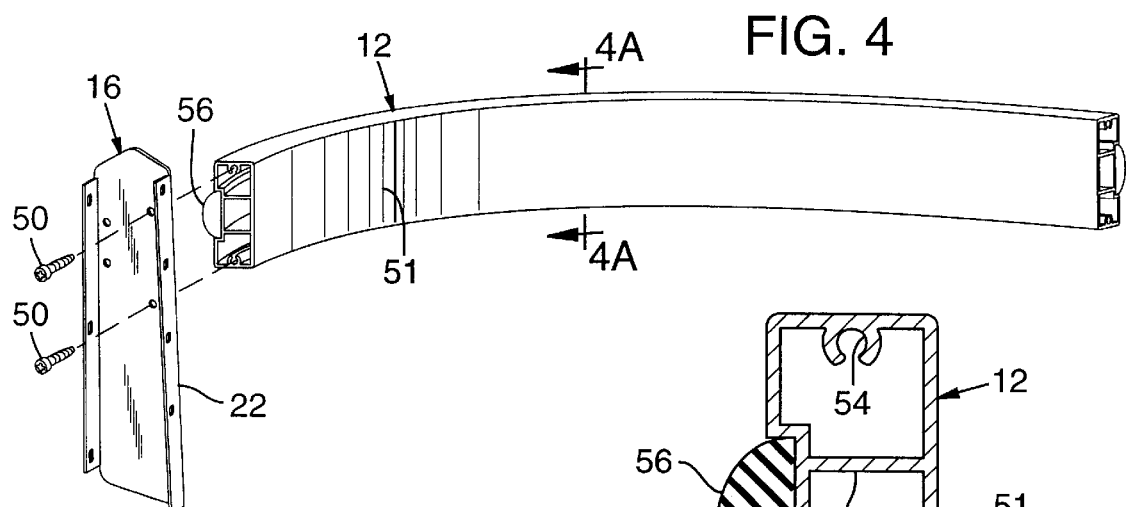
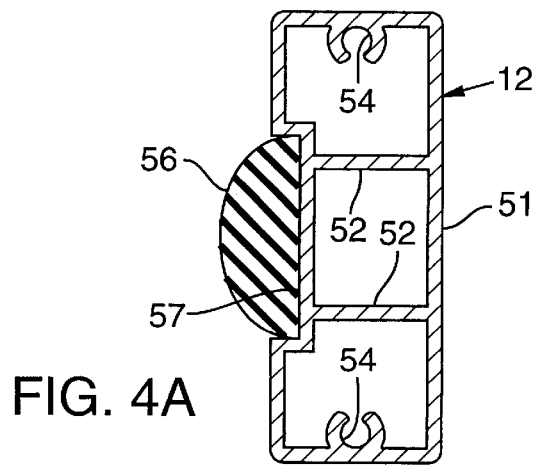
FIG. 4A

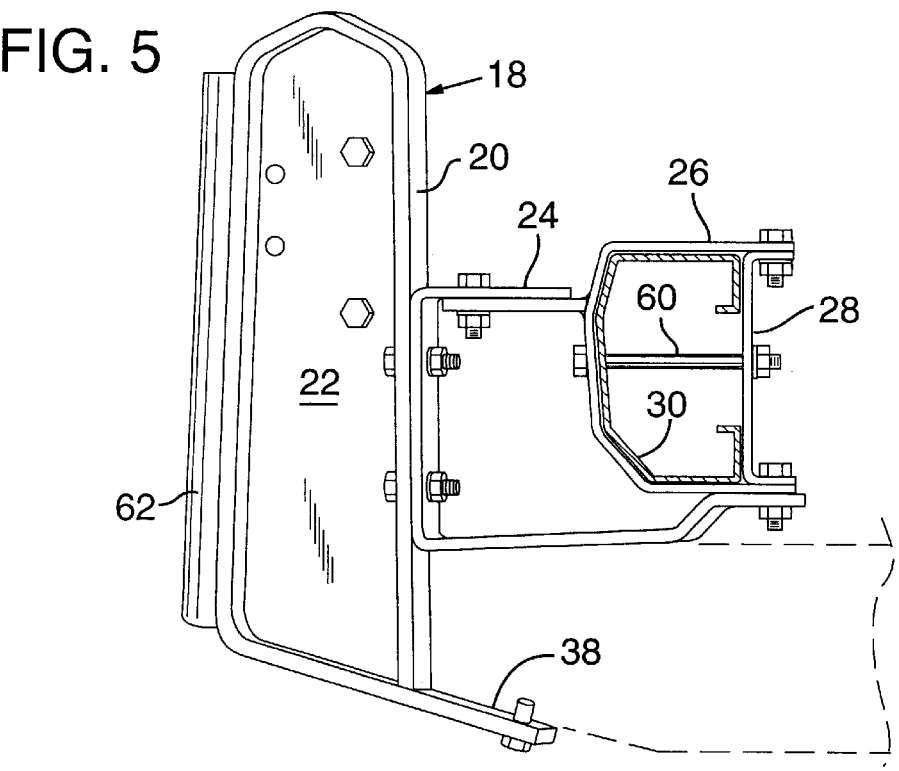
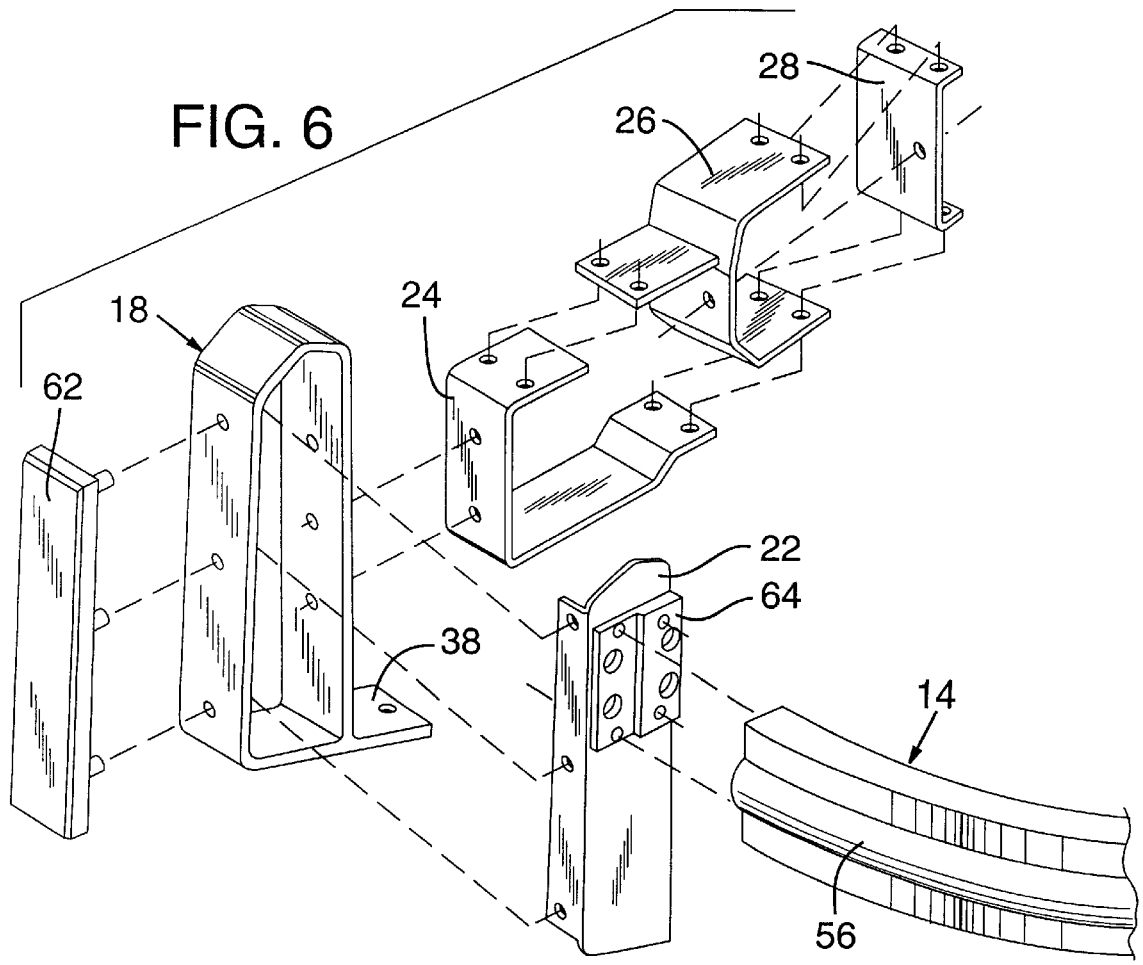

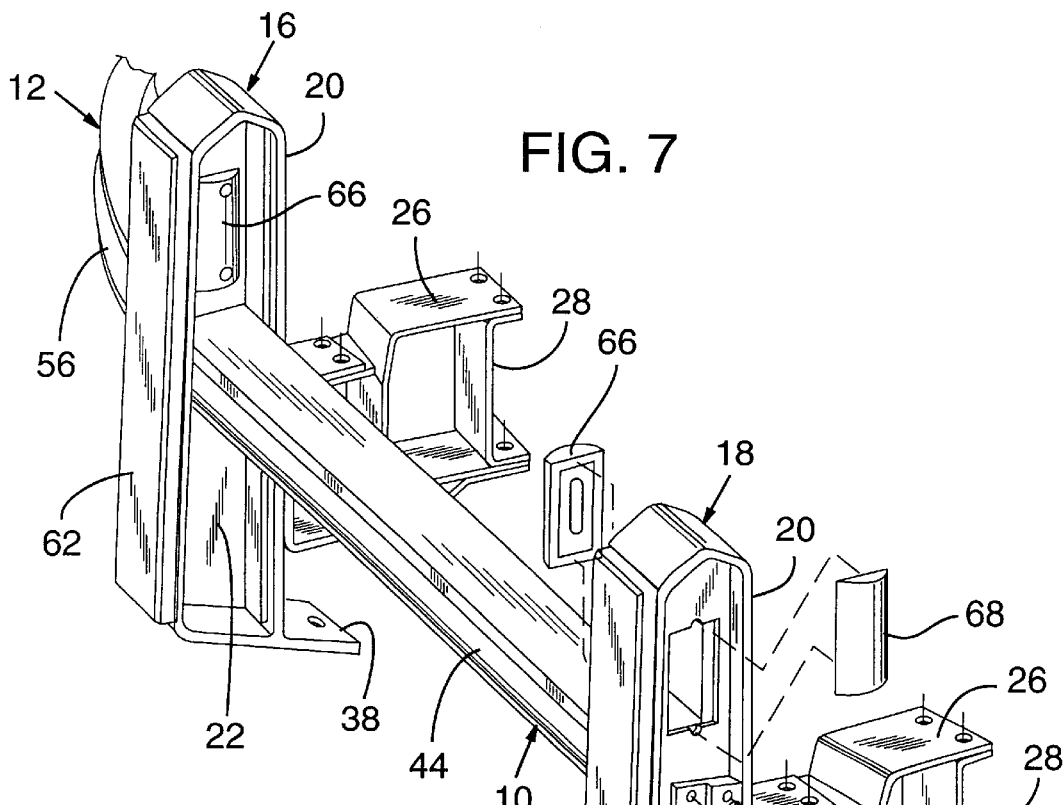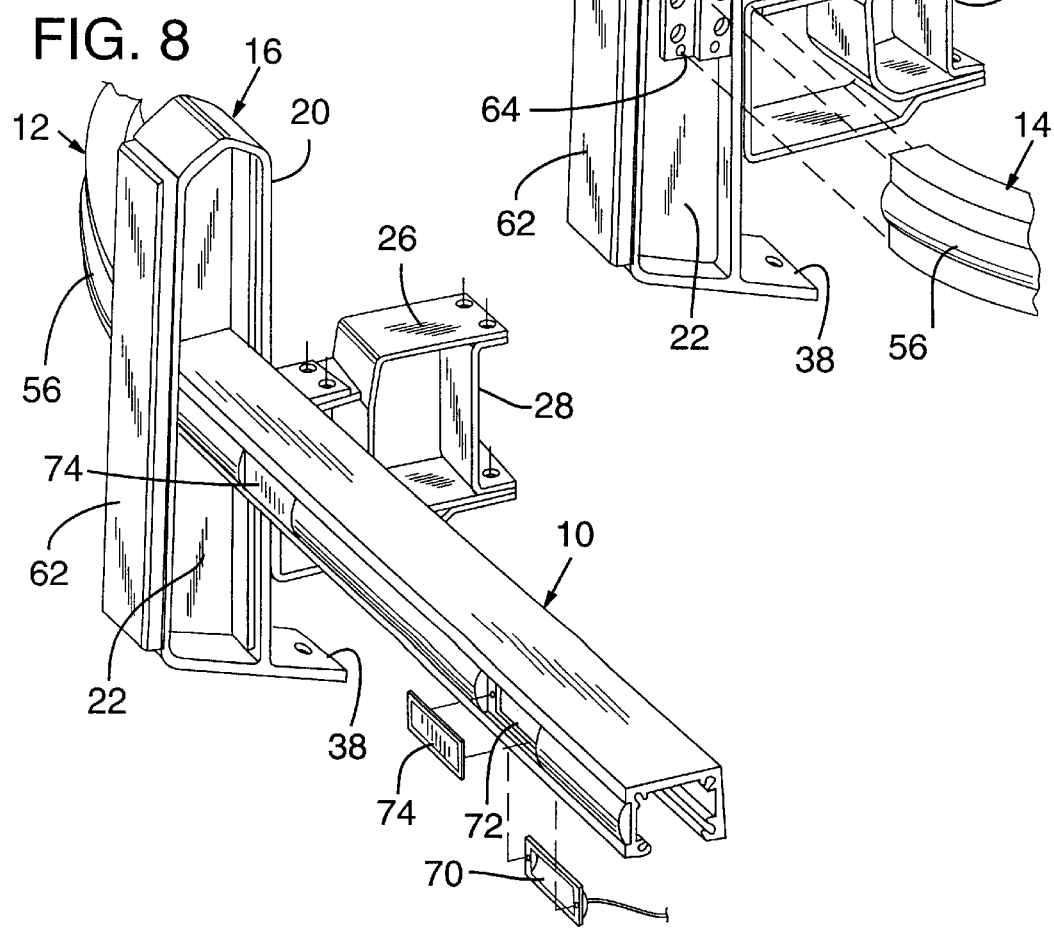

AUXILIARY PUSH BUMPER FOR MOTOR VEHICLE

BACKGROUND OF INVENTION

The subject matter of the present invention relates generally to bumpers for automobiles and other motor vehicles, and in particular relates to an auxiliary push bumper which is attached to the original bumper of the vehicle and spaced in front of such original bumper to prevent damage to the vehicle when it pushes another vehicle. Police vehicles may use such push bumpers because they are frequently called upon to push other vehicles when they are stuck or when the police vehicle is chasing a criminal suspect's vehicle. The auxiliary push bumper of the preset invention may be made of several extruded aluminum sections so that it is strong, lightweight and easily repaired when one section is damaged. Preferably, the auxiliary push bumper is clamped to the original bumper of the vehicle by brackets attached to a pair of bumper guards fastened to the opposite ends of a center section of such push bumper. Also, in one embodiment, two side sections of the push bumper are secured at their inner ends to the bumper guards and are fixed at their outer ends to the frame of the vehicle to provide a strong auxiliary bumper assembly. The auxiliary push bumper may be provided with additional lights including a pair of side lights mounted on the bumper guards which transmit light beams from the sides of the vehicle and a pair of front lights mounted on the center section of the push bumper which transmit light beams from the front of the vehicle.

Previously, an auxiliary bumper has been proposed as an impact protector apparatus for an automobile in U.S. Pat. No. 3,747,383 of T.L. Davis, issued Jul. 17, 1973. However, the auxiliary bumper of this patent employs two single-piece auxiliary bumpers which are positioned outside of the original front and rear bumpers. Each auxiliary bumper is attached between a pair of bumper guards which are welded to the ends of a pair of longitudinal structural members that extend parallel to the automobile frame on each side of the automobile and are bolted to the frame. However, unlike the present invention, Davis does not provide a lightweight auxiliary push bumper formed of extruded aluminum in several bumper sections which are joined by threaded fasteners to the bumper guards to enable removal of a bumper section when it is damaged. In addition, the bumper guards of the Davis auxiliary bumper are not clamped to the original bumper in the manner of the present invention. Instead, Davis employs two elongated structural members extending the length of the automobile which are bolted to the frame and have u-shaped ends which are fastened to the two auxiliary bumpers and extend below and outwardly of both the front and rear original bumpers. This auxiliary bumper of Davis would be heavy, expensive to manufacture or repair, and is difficult to install on an automobile or other vehicle.

U.S. Design Pat. Des No. 395,416 of Shklyaver, issued Jun. 23, 1998, also shows a push bumper for mounting on the original bumper of a vehicle apparently by clamping the push bumper to the original bumper of the vehicle. However, unlike the present invention, the push bumper of Shklyaver does not provide an auxiliary bumper of extruded aluminum sections for a light weight and easily-repairable bumper in the manner of the present invention. In addition, the push bumper is not fixed to the frame of the vehicle, but is only clamped to the original bumper so that it is not as strong.

U.S. Design Pat. Des No. 300,128 of Brennan, issued Mar. 7, 1989, shows a vehicle bumper having a pair of bumper guards mounted on a lower main push bumper and supporting an upper tubular brush guard bumper section which extends between the bumper guards and is attached at its opposite ends to the top of the main push bumper. This push bumper apparently is not an auxiliary push bumper that is mounted on an original bumper, but instead is used as a replacement for the original bumper of the vehicle which would be extremely expensive to install and repair.

As shown in U.S. Pat. No. 3,574,406 of Wessells, issued Apr. 13, 1971, it is old to provide the original bumper of a vehicle with a resilient rubber facing strip which is secured to such bumper by a slot in such strip. The bumper is formed of two sections, including a top member and a bottom member of stamped metal which are welded together. Thus, such bumper differs from that of the present invention in that it is not made of extruded aluminum and is not constructed in three sections which are joined together by fastening them to inserts in a pair of bumper guards so that a damaged section can be repaired easily by removal and replacement of such section, in the manner of the present invention.

SUMMARY OF THE INVENTION

It is therefore one object of the present invention to provide an auxiliary push bumper for a motor vehicle which is strong and lightweight by forming the auxiliary bumper of extruded aluminum or other metal.

Another object of the invention is to provide such an auxiliary push bumper which is made in several bumper sections which are mechanically attached together so that damage to one bumper section can be repaired inexpensively by mere replacement of only the damaged bumper section.

A further object of the present invention is to provide such an auxiliary push bumper which is clamped to the original bumper and has its opposite ends secured to the frame of the vehicle for a stronger bumper construction.

An additional object of the present invention is to provide such an auxiliary push bumper which is made of three extruded bumper sections including a center section and a pair of curved side sections joined to the opposite ends of the center section.

Still another object of the invention is to provide such an auxiliary push bumper having two bumper guards which are secured to the bumper sections at the two junctions between the side sections and the center section of the bumper at the opposite ends of the center section in order to releasably join the bumper sections together to provide a strong push bumper which is easily disassembled for repair.

A still further object of the present invention is to provide such an auxiliary push bumper which employs two side lights mounted on the bumper guards for directing light beams from the opposite sides of the vehicle and which may also have two front lights mounted in the center section of the bumper for directing light forward of the vehicle to provide greater visibility.

BRIEF DESCRIPTION OF DRAWINGS

Other objects and advantages of the present invention will be apparent from the following detailed description certain preferred embodiments thereof and from the attached drawings of which:

FIG. 3 is an exploded view of a center section of the auxiliary push bumper of FIG. 2;

FIG. 3A is an enlarged section view taken along the line 3A—3A of FIG. 3;

FIG. 4 is an exploded view of a side section of the push bumper of FIG. 2;

FIG. 4A is an enlarged section view taken along the line 4A—4A of FIG. 4;

FIG. 5 is an enlarged section view taken along the line 5—5 of FIG. 2 showing the push bumper attached to the original bumper;

FIG. 6 is an exploded view of the push bumper and brackets connected to the bumper guard of FIG. 5

FIG. 7 is an elevation view of a portion of the push bumper of FIG. 2 showing side lights mounted on the bumper guards with one side light shown as a partial exploded view;

FIG. 8 is an elevation view of a portion of the push bumper of FIG. 2 showing front lights mounted on the center section of the bumper with one light shown as a partial exploded view;

DETAILED DESCRIPTION OF PREFERRED EMBODIMENTS OF THE INVENTION

Figure 1:
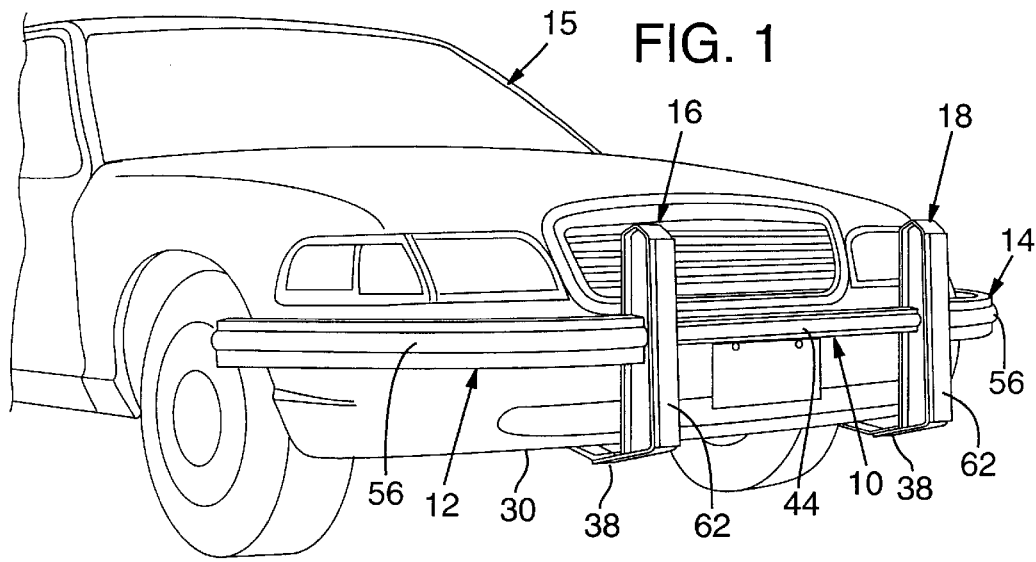
FIG. 1 is an elevation view of the front of an automobile with an auxiliary push bumper in accordance with one embodiment of the invention attached thereto.
Figure 2:
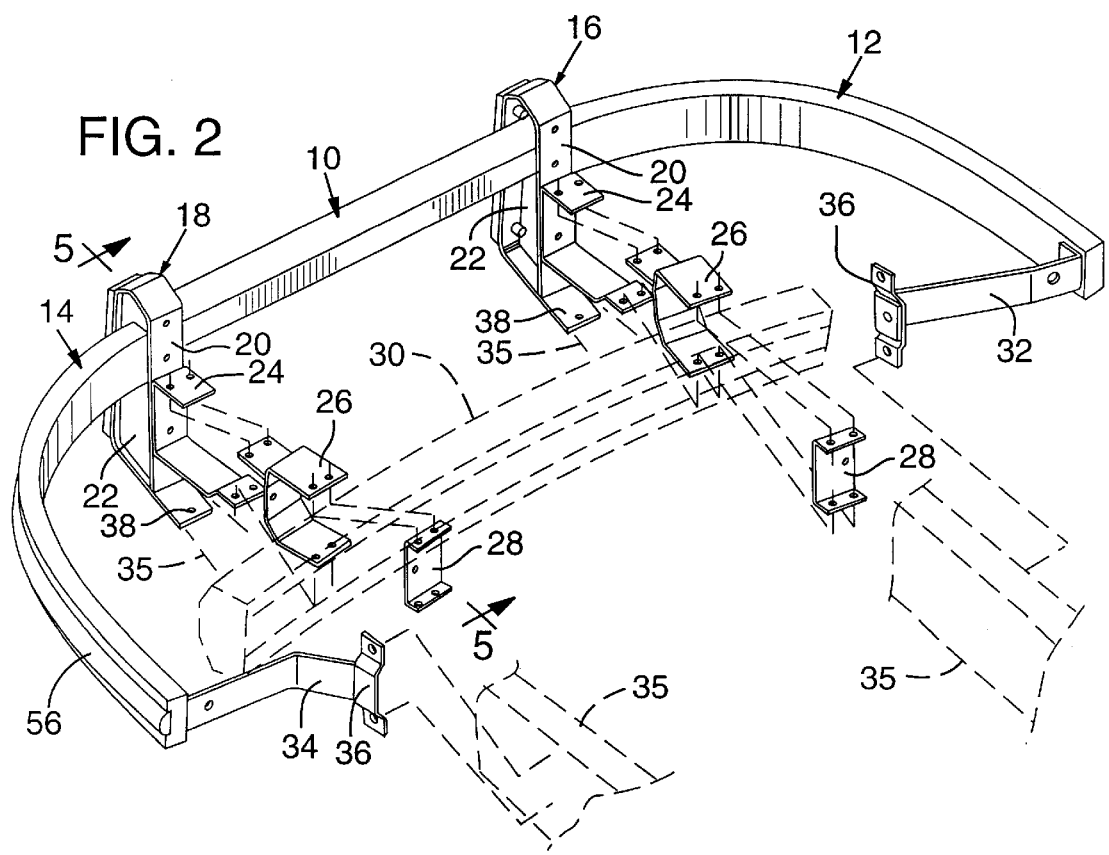
FIG. 2 is a partially exploded elevation view of the auxiliary push bumper of FIG. 1.

As shown in FIGS. 1 and 2 one embodiment of the auxiliary push bumper apparatus of the present invention includes a center bumper section 10 which is joined at its opposite ends to a right side bumper section 12 and a left side bumper section 14 which are mounted on the front end of a motor vehicle 15 such as a police car. A pair of bumper guards 16 and 18 are attached, respectively, to the inner end of the right side bumper section 12 and the inner end of the left side bumper section 14 at the two junctions formed by such side bumper sections with the opposite ends of the center bumper section 10. The bumper guards 16 and 18 are preferably formed by loops 20 of metal bar, such as steel or other suitable metal, which are each bolted to steel reinforcing plates 22 mounted within such loops. The auxiliary push bumper sections 10, 12 and 14 are each preferably made of extruded aluminum or other suitable metal, as hereafter discussed with respect to FIGS. 3 and 4, and are fastened by bolts to the reinforcing plates 22 of different one of the bumper guards 16 and 18. A pair of mounting brackets 24 and 26 are fastened to the loops 20 of the bumper guards 16 and 18 and are bolted together so that inner bracket 26 forms a clamping device with a backing plate 28 which is clamped around the original bumper 30 of the vehicle 15.

The outer ends of each of the side sections 12 and 14 of the push bumper are connected by brackets 32 and 34, respectively, to the frame 35 of the vehicle by a terminal member 36 which is bolted to the frame in the wheel wells of the vehicle. The bumper guards 16 and 18 are both provided with bottom bracket 38 which is also bolted to the frame 35 of the vehicle by a connecting plate (not shown) extending beneath the original bumper 30 for giving the push bumper extra strength.

As shown in FIG. 3 the center bumper section 10 of the push bumper includes a u-shaped channel member 40 formed of extruded aluminum, and a diagonal stiffener plate of aluminum 42 which is mounted diagonally within the channel member. Also, a scratch protection insert 44 of rubber or other elastomer material is mounted in a notch 45 on the front surface of the channel member 40 by spaced mounting tabs 46 which extend through mounting holes 48 in such channel member. The section view of the center section 10 of the bumper, shown in FIG. 3A, indicates the position of the stiffener plate 42 in dashed lines and shows the elastomer insert 44 with respect to the channel member 40.

As shown in FIG. 4, the side sections 12 and 14 of the auxiliary push bumper are each fastened to the bumper guard insert plate 22 of one of the bumper guards 16 and 18 by self-tapping screws 50 which extend through such inserts into screw sockets molded into the side section extrusions. The cross section of the side bumper section 12, shown in FIG. 4A, indicates the preferred form of a rectangular box extrusion 51 of the side sections 12 and 14 with two spaced internal webs 52 and two screw sockets 54. An elastomer insert 56 is mounted within a notch 57 on the outer surface of the side extrusion 14 as shown in FIG. 4A. The extruded aluminum bumper sections 10, 12 and 14 may be made of any aluminum alloy suitable for extrusion, such as alloy 6005A-T61. In one example the side section extrusion 51 has a height of 4" and a width of 1.5" and the center channel extrusion 40 has a height of 2" and a width of 2.8".

As shown in FIG. 5, the clamp formed by bolting the bracket 26 to the backing plate 28 clamps each bumper guard 16 and 18 to the original bumper 30. In addition, if necessary, an intermediate bolt 60 is also employed, extending through the middle of the original bumper from the bracket member 26 to the backing plate 28 for a stronger connection. A scratch-resistant elastomer insert 62 is mounted on the front face of each of the bumper guards 16 and 18 by insert tabs 46 extending through holes in the loop members 20 in a similar manner to the insert 44 in the center section of the push bumper as shown in FIG. 3.

As shown in the exploded view of FIG. 6, it may be desirable to provide an additional reinforcement plate 64 for the bumper guards 16 and 18, such plate being bolted to the stiffener insert 22 that is secured within the loop 20 of the bumper guard. The reinforcement plate 64 is attached by self-tapping screws 50 to the end of the side section 14 of the bumper.

As shown in FIG. 7 the push bumper of FIG. 2 may be provided with a pair of side lights 66 mounted in cut-outs of each of the stiffening inserts 22 of the bumper guards 16 and 18. The side lights 66 face outwardly from opposite sides of the bumper guards and are covered by a clear plastic cover 68 to protect them from damage. The side lights 66 each produce a light beam which is directed from the side of the vehicle to enable better illumination of the road and off-road conditions. This arrangement has the advantage that the side lights 66 are protected from impact by the bumper guard loops 20 and are in the proper position to project side beams of light.

As shown in FIG. 8, a pair of front lights 70 can also be provided on the center bumper section 10 by mounting them in two spaced cut-out holes 72 adjacent the opposite ends of such center section and which are covered with clear plastic light covers 74. The front lights 70 project light beams forward and downward from the push bumper for better road illumination.

Figure 9:
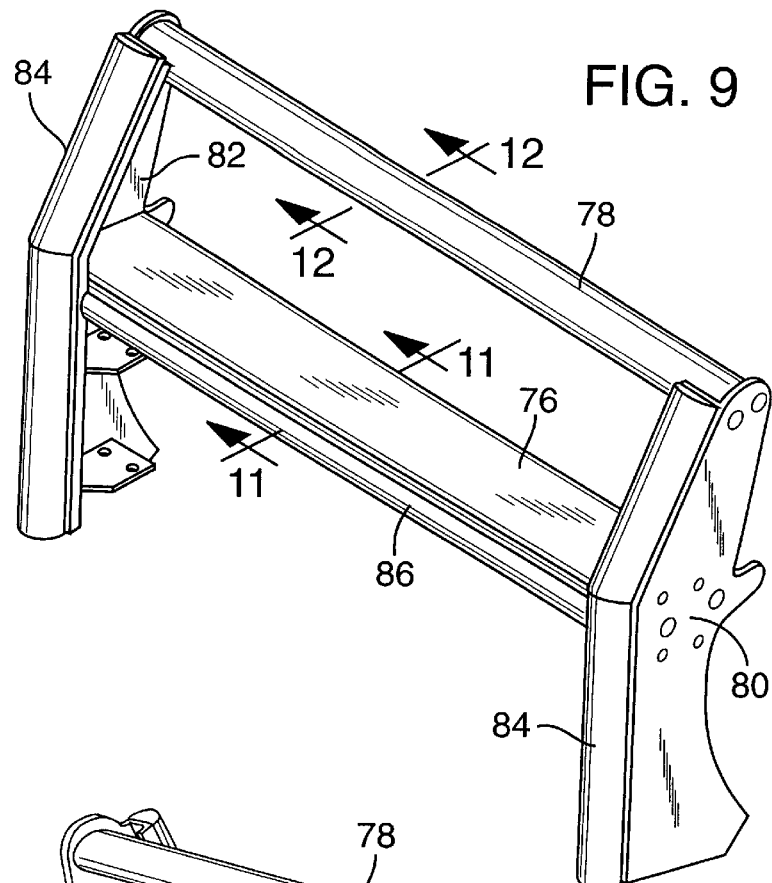
FIG. 9 is a front elevation view of a second embodiment of the push bumper of the present invention.
Figure 10:
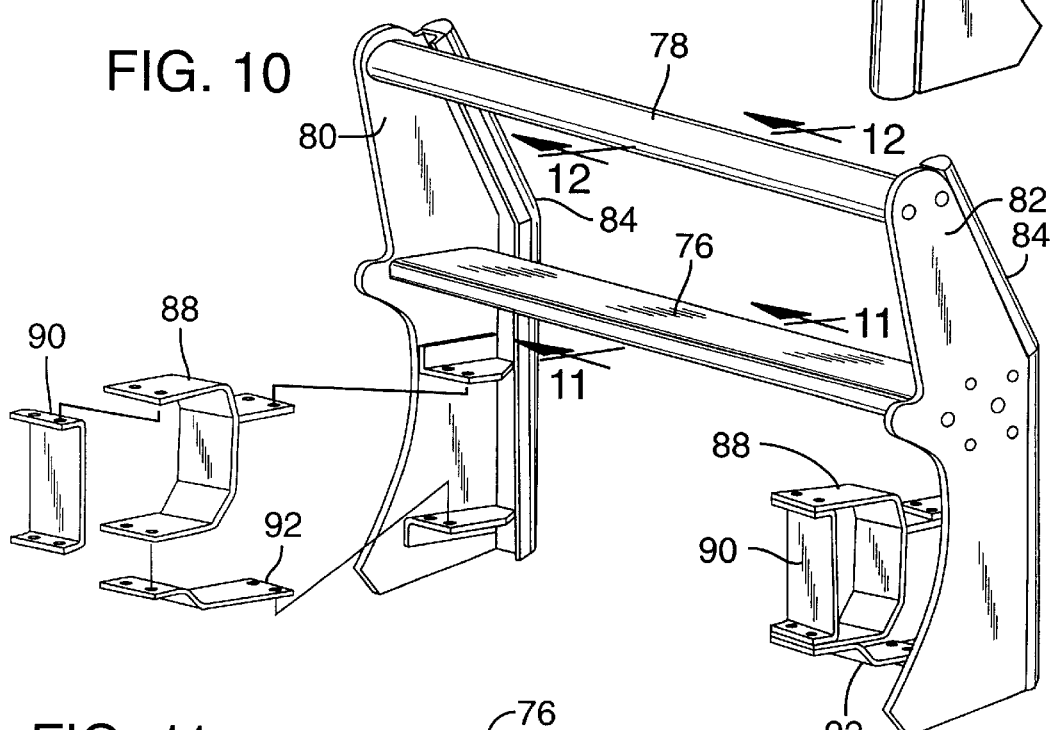
FIG. 10 is a partially exploded rear elevation view of the push bumper of FIG. 9.
Figure 11:
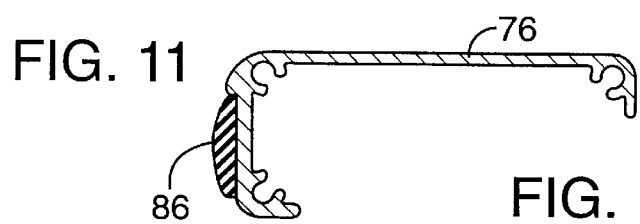
FIG. 11 is a section view taken along the line 11—11 of FIG. 9.
Figure 12:
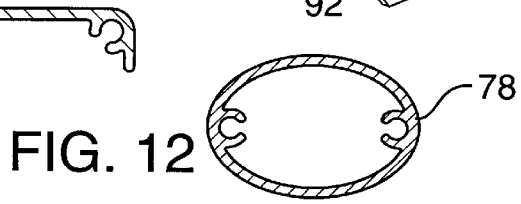
FIG. 12 is a section view taken along the line 12—12 of FIG. 9.

Another embodiment of the auxiliary push bumper of the present invention is shown in FIGS. 9 and 10 and includes a lower bumper section 76 and an upper bumper section 78 both formed of extruded aluminum and mounted between a pair of bumper guards 80 and 82 fastened to the opposite ends thereof. The bumper guards 80 and 82 are both provided with rubber insert 84 which extends along the front surface of such bumper guards. Lower bumper section 76 is provided with rubber insert 86 which extends along the front surface of the bumper section. The rubber inserts 84 and 86 protect the bumper guards 80 and 82 and the lower bumper section 76, respectively, in a similar manner to that shown in the embodiment of FIG. 2. In addition, side sections (not shown) of the push bumper similar to sections 12 and 14, may be attached to the bumper guards 80 and 82 of FIG. 9 in alignment with the lower center section 76 to provide a three section bumper in a similar manner to FIG. 2, in order to protect the vehicle fenders.

As shown in FIG. 10, the bumper guards 80 and 82 are each clamped to the original bumper 30 of the automobile by a bracket 88 and a backing plate 90 which are bolted together to form a clamp around the original bumper. In addition, while a lower bracket 92 is shown giving support to the upper bracket 88 such lower bracket may be fixed by a connecting plate (not shown) to the frame beneath the original bumper in the manner of bracket 38 of FIG. 2.

It will be obvious to those having ordinary skill in the art that many changes may be made in the above-described preferred embodiments of the invention. Therefore, the scope of the invention should be determined by the following claims:

I claim:

1. Auxiliary bumper apparatus for a motor vehicle, comprising:

a bumper center section secured at two junctions to one end of each of a pair of bumper side sections at the opposite ends of said center section so that said center section is fixed in position relative to said side sections;

fastener apparatus for attaching the other ends of the bumper side sections to the frame of the vehicle;

two bumper guards attached to the bumper at the different ones of the two junctions between the opposite ends of the center bumper section and the pair of side bumper sections, said bumper guards extending above the bumper sections; and brackets for fastening the bumper guards and the bumper junctions of the auxiliary bumper apparatus to an original bumper on the vehicle so that the bumper guards are spaced from the original bumper.

2. Bumper apparatus in accordance with claim 1 in which the bumper sections are made of extruded metal.

3. Bumper apparatus in accordance with claim 2 in which the extruded bumper sections are aluminum channel members.

4. Bumper apparatus in accordance with claim 1 in which the bumper side sections are curved and attached by brackets to the frame in the two front tire wheel wells of the vehicle.

5. Bumper apparatus in accordance with claim 1 in which inserts of elastomer material are mounted on the exterior of the center section and the side sections of the bumper.

6. Bumper apparatus in accordance with claim 3 in which the channel member of said center section is provided with a reinforcing member inserted diagonally into said channel member.

7. Bumper apparatus in accordance with claim 1 in which the bumper guards are formed of loops of metal and have stiffening members fastened within said loops, said bumper sections being fastened to said stiffening members.

8. Bumper apparatus in accordance with claim 1 in which the brackets for the bumper guards are fastened to clamps for clamping the bumper guards to the original bumper.

9. Bumper apparatus in accordance with claim 1 in which the bumper guards are each provided with an insert of elastomer material on their exterior surface.

10. Auxiliary bumper apparatus for a police motor vehicle, comprising:

an auxiliary bumper including at least two bumper side sections of extruded aluminum channel members;

a bumper center section fastened at its opposite ends to different ones of said side sections so that the center section is fixed in position relative to said side sections;

two bumper guards attached to the bumper sections; and brackets for fastening said auxiliary bumper to an original bumper so that the auxiliary bumper is spaced from the original bumper, said brackets being attached to the bumper guards, and including clamps for clamping the bumper guards to the original bumper.

11. Bumper apparatus in accordance with claim 10 in which the auxiliary bumper also includes two bumper guards which are fastened to different ones of the two junctions formed between the opposite ends of the center section and the two side sections.

12. Bumper apparatus in accordance with claim 10 in which the center section is an extruded channel of u-shaped cross section with a diagonal reinforcing member inserted diagonally into said center section channel.

13. Bumper apparatus in accordance with claim 12 in which the two side sections are curved and are extruded channels of a rectangular box shape with two spaced internal web portions.

14. Bumper apparatus in accordance with claim 12 in which a light is mounted on the bumper center section within an opening in the extruded channel.

15. Auxiliary bumper apparatus for a police motor vehicle, comprising:

an auxiliary bumper including a pair of bumper guards formed with loop members and reinforcing inserts within said loop members and a center bumper section extending between said pair of bumper guards;

a pair of side lights for transmitting light beams from the opposite sides of the vehicle; and said reinforcing inserts providing a pair of mounts for said pair of side lights for directing the light beam of each side light in an outward direction toward one side of the vehicle and away from said center bumper section.

16. Bumper apparatus in accordance with claim 15 in which the auxiliary bumper is formed of a center bumper section and two side bumper sections fastened to the opposite ends of said center section at two junctions.

17. Bumper apparatus in accordance with claim 16 in which the pair of bumper guards are fastened to the auxiliary bumper at said two junctions.

18. Bumper apparatus in accordance with claim 16 which also includes a pair of front lights for transmitting light beams from the front of the vehicle, said front lights being mounted in openings on the center bumper section which is an extruded aluminum channel member.

\* \* \* \* \*